March 8, 1960　　　L. KIRCHLER　　　2,927,389
HYDRAULIC APPARATUS FOR ACTUATING MATERIAL MOVING MEANS
Filed Oct. 9, 1956　　　3 Sheets-Sheet 1

FIG.1.

FIG.4.

Inventor:
Lewis Kirchler

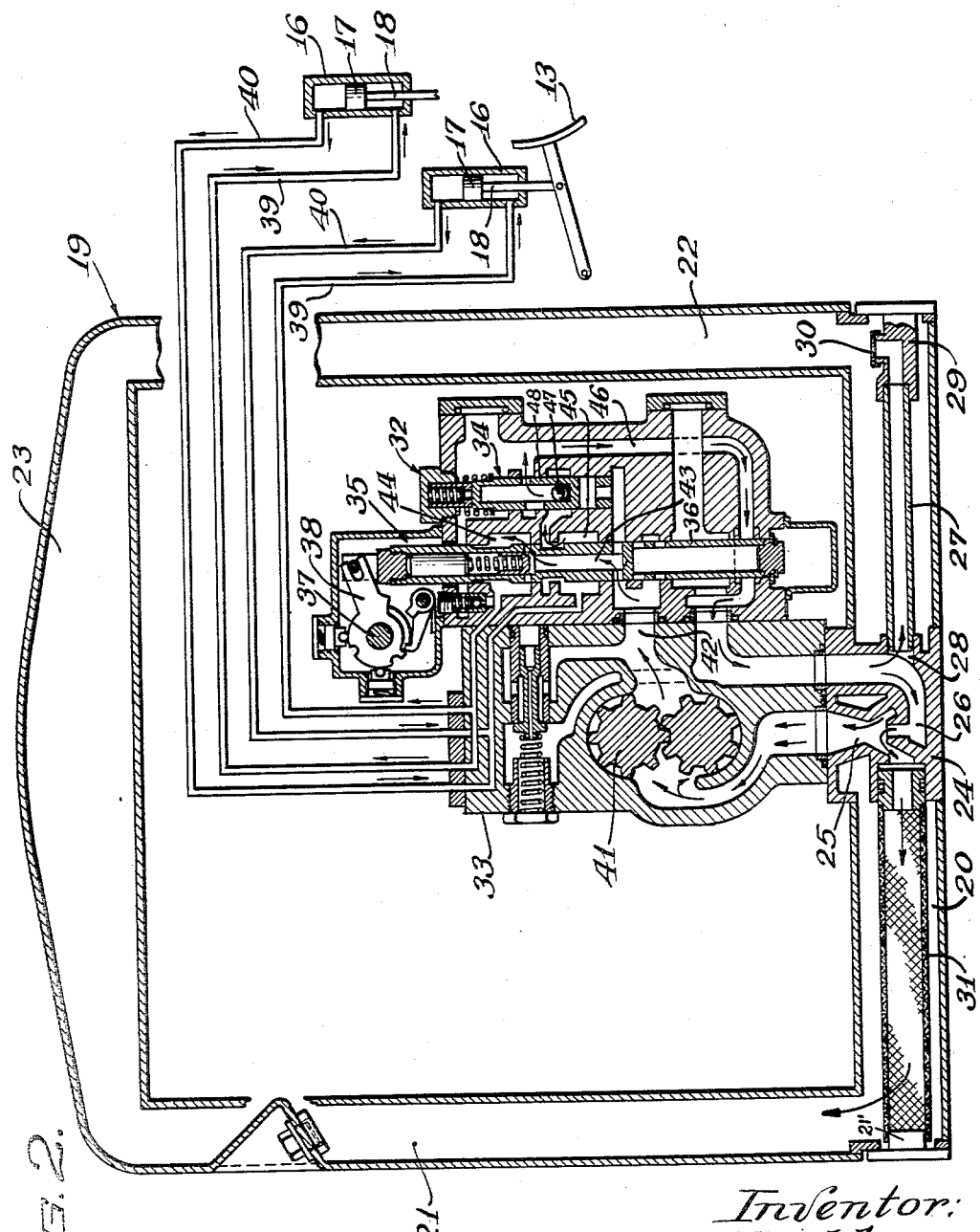

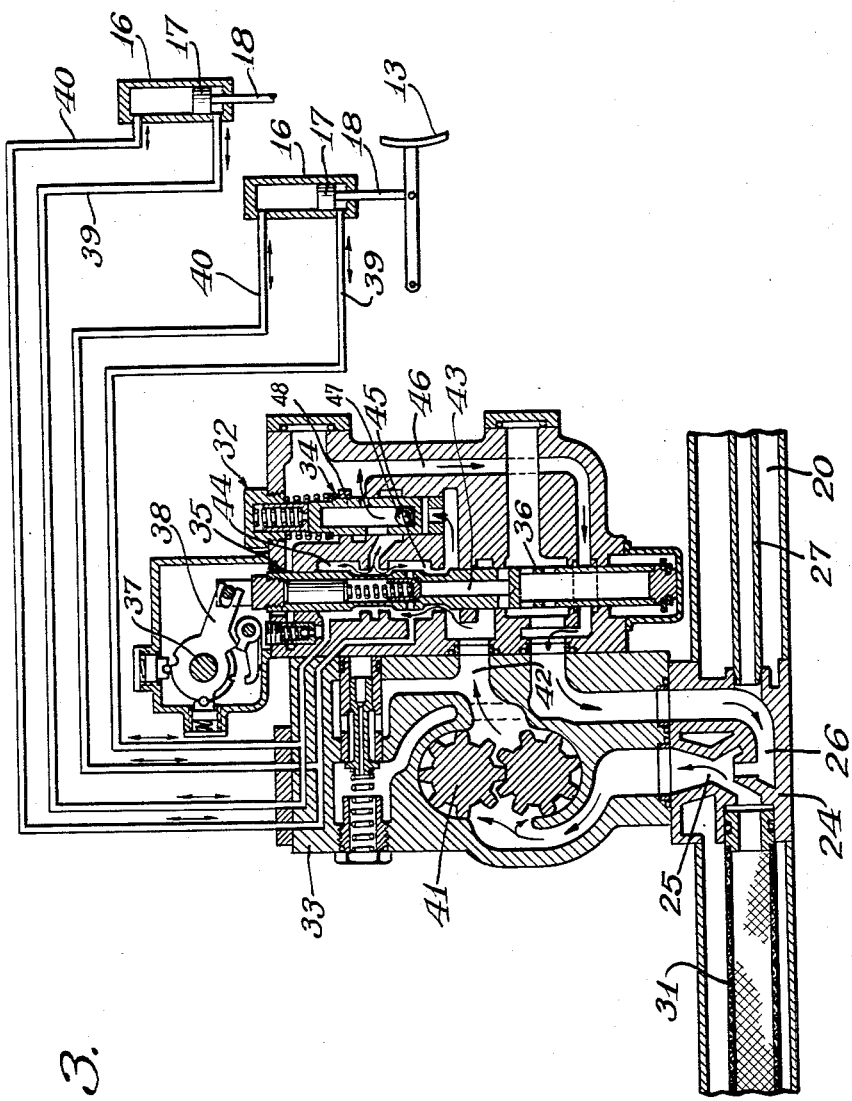

২,927,389

HYDRAULIC APPARATUS FOR ACTUATING MATERIAL MOVING MEANS

Lewis Kirchler, Chicago, Ill., assignor to International Harvester Company, a corporation of New Jersey Application October 9, 1956, Serial No. 614,924

4 Claims. (Cl. 37—144)

This invention relates to hydraulic apparatus for actuating material moving means and is primarily concerned with hydraulic apparatus for operating a bulldozer having a ground engageable blade mounted on a crawler tractor.

An object of the invention is to provide means for keeping the liquid in an hydraulic apparatus for actuating material moving means from getting too hot.

Another object of the invention is to provide a filter for hydraulic apparatus for actuating material moving means so as to keep the liquid clean.

A further object of the invention is to provide a filter for hydraulic apparatus for actuating material moving means that is self cleaning.

The foregoing and other objects of the invention will be apparent from the construction and arrangement illustrated in the accompanying drawings wherein:

Figure 1 is a side elevational view of a crawler tractor with a bulldozer having a ground engageable blade mounted thereon, Figure 2 is a cross sectional view through the hydraulic apparatus for operating the bulldozer wherein the fluid conducting means is shown in the operative condition when the ground engageable blade of the bulldozer is being hydraulically elevated, Figure 3 is a cross sectional view through the hydraulic apparatus with the fluid conducting means illustrated in a float position wherein the hydraulic system is in a neutral condition and the ground engageable blade is freely movable either in an upward direction or a downward direction, and Figure 4 is an enlarged view of the lower part of Figure 2 showing the direction of flow of fluid when there is a pressure surge in the hydraulic apparatus resulting from an upward movement of the ground engageable blade.

When liquid is continuously circulated through an hydraulic apparatus it will become heated and may expand and cause breaking of the apparatus. The invention proposes a means for keeping the liquid in an hydraulic apparatus cool so that the apparatus will not break. The invention is comprised of a tank containing a liquid and a structure is secured to the tank and is formed with a jet and a passage communicating with the jet. A conduit and a filter are disposed in the tank in fluid communication with the passage to the jet. As the warm liquid moves through the hydraulic apparatus a portion of it flows into the conduit and then into the tank. The portion of warm liquid thus removed is replaced by an equal portion of cool liquid flowing through the jet from the filter at an increased velocity. Thus a means is provided for keeping the liquid in the hydraulic apparatus from getting too hot. In addition the filter keeps the liquid clean and when the direction of flow through the filter is reversed the filter is self cleaning.

In the drawings, 10 generally designates a vehicle illustrated as a crawler tractor having a power means in the form of an internal combustion engine 11. The crawler tractor 10 has a material moving means in the form of a bulldozer generally indicated at 12. The bulldozer 12 is comprised of a ground engageable blade 13 and members 14 pivotally mounted on the tractor 10 and pivotally connected to the blade and extensible and contractible means 15 pivotally connected to the respective member and to the blade 13. A pair of cylinders 16 are pivotally mounted on the tractor 10 and a piston 17 is disposed in each cylinder 16 and each piston 17 has a piston rod 18 projecting from the cylinder 16 and pivotally connected to the blade 13. A tank 19 is made as a part of the tractor radiator guard and is comprised of four hollow sections 20, 21, 22 and 23 in communication with each other and arranged in the form of a rectangle. The tank 19 contains a fluid such as oil. A structure 24 is disposed in the section 20 of the tank 19 centrally thereof and is secured thereto and is formed with a jet 25 and a passage 26 in communication with the jet 25. A conduit 27 is positioned in the section 20 of the tank longitudinally thereof on one side of the structure 24 and has one end secured in an opening 28 in the structure 24 so that the interior of the conduit 27 is in communication with the passage 26 and has its other end disposed adjacent the section 22. An extension 29 has an opening therethrough and is secured to the outer end of the conduit 27 and the tank 19 and a screen 30 is disposed over the opening and is secured to the extension 29. A filter 31 is positioned in the section 20 of the tank longitudinally thereof on the other side of the structure 24 and has one end secured in the jet 25 in communication with the jet and has its other end supported by an inwardly projecting extension 21' of the section 21 on the tank 19 as best shown in Figure 4.

A fluid conducting means 32 is mounted on the tractor 10 and includes a housing 33 and a flow control valve 34. The fluid conducting means 32 also includes a control means 35. The control means 35 is comprised of fluid passage communicating and shutting off means 36 and a horizontal rod 37 and a link 38 fixedly secured on the horizontal rod and pivotally connected to the fluid passage communicating and shutting off means 36 and the manual means such as a manually operable control lever (not shown) is connected to the rod for rotating it in either direction to move the fluid passage communicating and shutting off means 36 up or down. A pair of fluid lines 39 and 40 are in communication with the interior of the respective cylinder 16 on opposite ends thereof as shown in Figures 2 and 3, and these lines lead into the housing 33 to the fluid passage communicating and shutting off means 36. A pump 41 is disposed in the housing 33 and is operatively connected to the engine in a conventional manner.

In Figure 1 the blade 13 of the bulldozer is shown in a raised position in dotted lines and in Figure 2 the blade is schematically shown in a raised position and in addition flow of liquid through the fluid conducting means 32 when the blade 13 is elevating under hydraulic power is shown. When the blade 13 is elevating under the influence of hydraulic power the pump 41 is moving fluid through passage 42 into bore 43 of the passage communicating and shutting off means 36 and thence into a space 44 in the housing and thence into lines 39 to the cylinders 16 and against the lower faces of the pistons 17. As the pistons 17 retract fluid moves out of the upper regions of the cylinders 16 into lines 40 and then to space 45 in the housing and then through the flow control valve 34 and hole 47 in element 48 thereof into a passage 46 and then into the passage 26. As the fluid moves through passage 26 about 25% of it flows into the conduit 27 through the screen 30 and into the tank 19. This means that 25% of the oil that has been used flows directly back into the tank 19 through conduit 27. The jet 25 increases the velocity of the oil flowing to the pump 41 and the 25% of oil that went into the tank through conduit 27 is replaced by a like amount flowing with the aid of aspiration from the jet 25 through the filter and the oil flowing through the filter is cool oil and it has also been filtered. Thus by bypassing a fraction of the warm oil and replacing it with cool oil the oil in the apparatus is always kept at a reasonable temperature. This prevents the oil from getting too hot and expanding and breaking the hydraulic apparatus. In the float condition shown in Figure 3 wherein the cylinders 16 are neither energized or hydraulically locked the fluid pressures acting on opposite ends of the pistons 17 are equal. In this condition fluid is moved by the pump 41 through passage 42 into space 45 around the passage communicating and shutting off means 36 into the flow control valve 34 and hole 47 thereof to the passage 46 and back to the pump 41 through passage 26 and jet 25. The fluid in lines 39 and 40 is in communication with each other and with the return passage 46 through spaces 44 and 45 and flow control valve 34. If by actuation of the control means 35 the fluid conducting means 32 is moved into float condition (Figure 3) and the blade 13 is moved upward due to sliding on uneven ground, the upward movement of the blade 13 will cause the pistons 17 to move upwardly or retractively in the cylinders. This will cause more fluid from the upper regions of the cylinders 16 to move out of the cylinders rapidly into lines 40 into space 44 through the flow control valve 34 into passage 46 and then into passage 26 than fluid entering the lower regions of the cylinders 16 resulting in a fluid pressure surge and causing the direction of oil flow in filter 31 to be reversed as shown in Figure 4. The reversal in the direction of fluid flow in the filter 31 is due to the volumetric displacement difference between the upper and lower regions of the cylinders 16 by reason of the displacement of the piston rods 18. Since the pump 41 will not accept more oil on its intake side than it delivers into the passage 42, the result is that more oil passes through the passage 26 than the pump 41 will accept. Thus the pressure at the jet 25 increases because of the excess oil from the volumetric displacement of the piston rods 18 which the pump will not accept. The excess oil therefore has nowhere to move except by reverse flow through the filter 31 and the conduit 27. The aspirating function of the jet 25 is thus stopped during this condition. The same condition also exists when the blade 13 is elevated under hydraulic power as shown in Figure 2. This reverse flow of oil through the filter 31 causes the filter to clean itself.

What is claimed is:

1. In a vehicle having power means and a material moving means operably mounted thereon, a cylinder mounted on said vehicle, a piston disposed in said cylinder having a piston rod operatively connected to said material moving means, said cylinder having a greater volumetric fluid discharge when said piston is moved in one direction than when said piston is moved in the other direction, a tank mounted on said vehicle and containing a fluid, a structure mounted on said vehicle having a jet disposed therein, a passage communicatively connected to said jet, a filter positioned in said tank communicating with said jet in aspirating relation, a fluid conducting means mounted on said vehicle communicatively connected with the interior end regions of said cylinder adjacent opposite ends of said piston, a pump mounted on said vehicle operatively connected to the said power means and in communication with said jet and said passage and said fluid conducting means, control means disposed in said fluid conducting means for directing fluid to and from said cylinder to control the movement of said piston and said material moving means, and said jet being positioned to reverse the flow of fluid in said filter for purging thereof resulting from said greater volumetric fluid discharge when said piston is moved in said one direction.

2. In a vehicle having power means and a ground engageable blade movable arcuately in substantially vertical direction mounted on said vehicle, a cylinder mounted on said vehicle, a piston disposed in said cylinder having a piston rod and said piston rod being operatively connected to said blade, said cylinder having a greater volumetric fluid discharge when said piston is moved in one direction than when said piston is moved in the other direction, a tank mounted on said vehicle and containing a fluid, a structure mounted on said vehicle and having a jet disposed therein, a passage communicating with said jet, a conduit positioned in said tank communicatively connecting said tank with said passage in said structure, a filter positioned in said tank communicatively connected to said tank and said jet in aspirating relation, a fluid conducting means mounted on said vehicle communicatively connected with the interior end regions of said cylinder adjacent opposite ends of said piston, a pump mounted on the vehicle operatively connected to the power means and in communication with said jet and said passage and said fluid conducting means, and control means in said fluid conducting means for directing fluid to and from the cylinder to control the movement of said piston and said blade, said jet being positioned to reverse the flow of fluid in said filter resulting from said greater volumetric fluid discharge when said piston is moved in said one direction.

3. In a vehicle having an engine and a blade movable arcuately in substantially vertical direction mounted on said vehicle, a plurality of cylinders mounted on said vehicle, a piston disposed in each of said cylinders having a piston rod, said piston rods being operatively connected to said blade, each of said cylinders having a greater volumetric fluid discharge when its piston is moved in a direction to elevate said blade than when its piston is moved in a direction to lower said blade, a tank comprising four hollow sections in communication with each other and containing a fluid, a structure disposed in one of said sections of said tank centrally thereof and secured thereto, said structure having a jet disposed therein and a passage communicating with said jet, a conduit positioned in said one of said sections of said tank on one side of said structure in communication with said tank and said passage of said structure, a filter positioned in said one of said sections of said tank on the other side of said structure and communicatively connecting said tank with said jet of said structure, a fluid conducting means mounted on said vehicle communicatively connected with the interior end regions of said cylinders adjacent opposite ends of said pistons, a pump mounted on said vehicle operatively connected to said engine and in communication with said jet and said passage and said fluid conducting means, control means in said fluid conducting means for directing fluid to and from said cylinders to control the movement of said pistons and said blade, said jet being positioned to reverse the flow of fluid in said filter resulting from said greater volumetric fluid discharge when said pistons are moved in a direction to elevate said blade.

4. In a vehicle having an engine and a ground engageable blade movable arcuately in substantially vertical direction mounted on said vehicle, a plurality of cylinders mounted on said vehicle, a piston disposed in each of said cyilnders having a piston rod, said piston rods being operatively connected to said blade, each of said cylinders having a greater volumetric fluid discharge when its piston is moved in a direction to elevate said blade than when its piston is moved in a direction to lower said blade, a tank comprising four hollow sections in communication with each other and containing a fluid, a structure disposed in one of said sections in the lower portion of said tank centrally thereof and secured thereto, said structure having a jet disposed therein and a passage communicating with said jet, a conduit positioned in said one of said sections of said tank horizontally thereof on one side of said structure, one end of said conduit communicating with said passage in said structure and its other end disposed in an adjacent section of said tank, a filter positioned in said one of said sections of said tank horizontally thereof adjacent the other side of said structure, one end of said filter communicating with said jet in said structure and its other end disposed in an adjacent section of said tank, a fluid conducting means mounted on said vehicle communicatively connected with the interior end regions of said cylinders adjacent opposite ends of said pistons, a pump mounted on said vehicle operatively connected to said engine and in communication with said jet and said passage and said fluid conducting means, control means in said fluid conducting means for directing fluid to and from said cylinders to effect the movement of said control pistons and said blade, said jet being positioned to reverse the flow of fluid in said filter resulting from said greater volumetric fluid discharge when said pistons are moved in a direction to elevate said blade.

References Cited in the file of this patent

UNITED STATES PATENTS

| | | |
|---|---|---|
| 1,759,447 | Fisher | May 20, 1930 |
| 1,808,139 | Hozack | June 2, 1931 |
| 2,007,780 | Wardle | July 9, 1935 |
| 2,203,938 | Barrett | June 11, 1940 |
| 2,573,943 | Ziskal | Nov. 6, 1951 |
| 2,650,712 | Slonneger | Sept. 1, 1953 |
| 2,778,131 | Herr | Jan. 22, 1957 |